(12) United States Patent
Katz

(10) Patent No.: US 9,110,785 B1
(45) Date of Patent: Aug. 18, 2015

(54) ORDERED MERGE OF DATA SECTORS THAT BELONG TO MEMORY SPACE PORTIONS

(71) Applicant: DENSBITS TECHNOLOGIES LTD., Haifa (IL)

(72) Inventor: Michael Katz, Haifa (IL)

(73) Assignee: DENSBITS TECHNOLOGIES LTD., Haifa (IL)

( * ) Notice: Subject to any disclaimer, the term of this patent is extended or adjusted under 35 U.S.C. 154(b) by 142 days.

(21) Appl. No.: 14/045,681

(22) Filed: Oct. 3, 2013

Related U.S. Application Data

(63) Continuation-in-part of application No. 13/859,497, filed on Apr. 9, 2013, which is a continuation-in-part of application No. 13/434,083, filed on Mar. 29, 2012, now Pat. No. 8,996,790.

(60) Provisional application No. 61/485,397, filed on May 12, 2011.

(51) Int. Cl.
G06F 12/00 (2006.01)
G06F 12/02 (2006.01)

(52) U.S. Cl.
CPC .... *G06F 12/0246* (2013.01); *G06F 2212/7203* (2013.01)

(58) Field of Classification Search
CPC ............ G06F 12/0246; G06F 2212/7203
See application file for complete search history.

(56) References Cited

U.S. PATENT DOCUMENTS

| | | | |
|---|---|---|---|
| 4,430,701 A | 2/1984 | Christian et al. | |
| 4,463,375 A | 7/1984 | Macovski | |
| 4,584,686 A | 4/1986 | Fritze | |
| 4,589,084 A | 5/1986 | Fling et al. | |
| 4,777,589 A | 10/1988 | Boettner et al. | |
| 4,866,716 A | 9/1989 | Weng | |
| 5,003,597 A | 3/1991 | Merkle | |
| 5,077,737 A | 12/1991 | Leger et al. | |
| 5,297,153 A | 3/1994 | Baggen et al. | |
| 5,305,276 A | 4/1994 | Uenoyama | |
| 5,592,641 A | 1/1997 | Fandrich et al. | |
| 5,623,620 A | 4/1997 | Fandrich et al. | |
| 5,640,529 A | 6/1997 | Hasbun | |
| 5,657,332 A | 8/1997 | Auclair et al. | |

(Continued)

OTHER PUBLICATIONS

Search Report of PCT Patent Application WO 2009/118720 A3, Mar 4, 2010.

(Continued)

*Primary Examiner* — John Lane
(74) *Attorney, Agent, or Firm* — Dentons US LLP

(57) ABSTRACT

A method, non-transitory computer readable medium and a system for managing a non-volatile memory device. The method includes receiving data sectors; writing the data sectors into a buffer of the non-volatile memory device; maintaining at least one management data structure that comprises (a) location metadata about a location of each data sector in the buffer (b) timing metadata for each memory space portion that includes at least one data sector that is currently buffered in the buffer, selecting a selected buffer block in response to the location metadata and the timing metadata; and merging, before the buffer becomes full, data sectors of all of the at least one certain memory space portion into a sequential portion of the non-volatile memory device thereby emptying the selected buffer block, wherein the sequential portion differs from the buffer.

22 Claims, 12 Drawing Sheets

(56) References Cited

U.S. PATENT DOCUMENTS

| | | |
|---|---|---|
| 5,663,901 A | 9/1997 | Wallace et al. |
| 5,724,538 A | 3/1998 | Bryg et al. |
| 5,729,490 A | 3/1998 | Calligaro et al. |
| 5,740,395 A | 4/1998 | Hasbun et al. |
| 5,745,418 A | 4/1998 | Ma et al. |
| 5,778,430 A | 7/1998 | Giovannetti et al. |
| 5,793,774 A | 8/1998 | Usui et al. |
| 5,920,578 A | 7/1999 | Zook et al. |
| 5,926,409 A | 7/1999 | Engh et al. |
| 5,933,368 A | 8/1999 | Ma et al. |
| 5,956,268 A | 9/1999 | Lee |
| 5,956,473 A | 9/1999 | Ma et al. |
| 5,968,198 A | 10/1999 | Hassan et al. |
| 5,982,659 A | 11/1999 | Irrinki et al. |
| 6,011,741 A | 1/2000 | Wallace et al. |
| 6,016,275 A | 1/2000 | Han |
| 6,038,634 A | 3/2000 | Ji et al. |
| 6,081,878 A | 6/2000 | Estakhri et al. |
| 6,094,465 A | 7/2000 | Stein et al. |
| 6,119,245 A | 9/2000 | Hiratsuka |
| 6,182,261 B1 | 1/2001 | Haller et al. |
| 6,192,497 B1 | 2/2001 | Yang et al. |
| 6,195,287 B1 | 2/2001 | Hirano |
| 6,199,188 B1 | 3/2001 | Shen et al. |
| 6,209,114 B1 | 3/2001 | Wolf et al. |
| 6,259,627 B1 | 7/2001 | Wong |
| 6,272,052 B1 | 8/2001 | Miyauchi |
| 6,278,633 B1 | 8/2001 | Wong et al. |
| 6,279,133 B1 | 8/2001 | Vafai et al. |
| 6,301,151 B1 | 10/2001 | Engh et al. |
| 6,370,061 B1 | 4/2002 | Yachareni et al. |
| 6,374,383 B1 | 4/2002 | Weng |
| 6,504,891 B1 | 1/2003 | Chevallier |
| 6,532,169 B1 | 3/2003 | Mann et al. |
| 6,532,556 B1 | 3/2003 | Wong et al. |
| 6,553,533 B2 | 4/2003 | Demura et al. |
| 6,560,747 B1 | 5/2003 | Weng |
| 6,637,002 B1 | 10/2003 | Weng et al. |
| 6,639,865 B2 | 10/2003 | Kwon |
| 6,674,665 B1 | 1/2004 | Mann et al. |
| 6,675,281 B1 | 1/2004 | Oh et al. |
| 6,704,902 B1 | 3/2004 | Shinbashi et al. |
| 6,751,766 B2 | 6/2004 | Guterman et al. |
| 6,772,274 B1 | 8/2004 | Estakhri |
| 6,781,910 B2 | 8/2004 | Smith |
| 6,792,569 B2 | 9/2004 | Cox et al. |
| 6,873,543 B2 | 3/2005 | Smith et al. |
| 6,891,768 B2 | 5/2005 | Smith et al. |
| 6,914,809 B2 | 7/2005 | Hilton et al. |
| 6,915,477 B2 | 7/2005 | Gollamudi et al. |
| 6,952,365 B2 | 10/2005 | Gonzalez et al. |
| 6,961,890 B2 | 11/2005 | Smith |
| 6,968,421 B2 | 11/2005 | Conley |
| 6,990,012 B2 | 1/2006 | Smith et al. |
| 6,996,004 B1 | 2/2006 | Fastow et al. |
| 6,999,854 B2 | 2/2006 | Roth |
| 7,010,739 B1 | 3/2006 | Feng et al. |
| 7,012,835 B2 | 3/2006 | Gonzalez et al. |
| 7,038,950 B1 | 5/2006 | Hamilton et al. |
| 7,068,539 B2 | 6/2006 | Guterman et al. |
| 7,079,436 B2 | 7/2006 | Perner et al. |
| 7,149,950 B2 | 12/2006 | Spencer et al. |
| 7,177,977 B2 | 2/2007 | Chen et al. |
| 7,188,228 B1 | 3/2007 | Chang et al. |
| 7,191,379 B2 | 3/2007 | Adelmann et al. |
| 7,196,946 B2 | 3/2007 | Chen et al. |
| 7,203,874 B2 | 4/2007 | Roohparvar |
| 7,212,426 B2 | 5/2007 | Park et al |
| 7,290,203 B2 | 10/2007 | Emma et al. |
| 7,292,365 B2 | 11/2007 | Knox |
| 7,301,928 B2 | 11/2007 | Nakabayashi et al. |
| 7,310,654 B2 * | 12/2007 | McNeil .................. 707/654 |
| 7,315,916 B2 | 1/2008 | Bennett et al. |
| 7,388,781 B2 | 6/2008 | Litsyn et al. |
| 7,395,404 B2 | 7/2008 | Gorobets et al. |
| 7,441,067 B2 | 10/2008 | Gorobets et al. |
| 7,443,729 B2 | 10/2008 | Li et al. |
| 7,450,425 B2 | 11/2008 | Aritome |
| 7,454,670 B2 | 11/2008 | Kim et al. |
| 7,466,575 B2 | 12/2008 | Shalvi et al. |
| 7,533,328 B2 | 5/2009 | Alrod et al. |
| 7,558,109 B2 | 7/2009 | Brandman et al. |
| 7,593,263 B2 | 9/2009 | Sokolov et al. |
| 7,610,433 B2 | 10/2009 | Randell et al. |
| 7,613,043 B2 | 11/2009 | Cornwell et al. |
| 7,619,922 B2 | 11/2009 | Li et al. |
| 7,697,326 B2 | 4/2010 | Sommer et al. |
| 7,706,182 B2 | 4/2010 | Shalvi et al. |
| 7,716,538 B2 | 5/2010 | Gonzalez et al. |
| 7,804,718 B2 | 9/2010 | Kim |
| 7,805,663 B2 | 9/2010 | Brandman et al. |
| 7,805,664 B1 | 9/2010 | Yang et al. |
| 7,844,877 B2 | 11/2010 | Litsyn et al. |
| 7,911,848 B2 | 3/2011 | Eun et al. |
| 7,961,797 B1 | 6/2011 | Yang et al. |
| 7,975,192 B2 | 7/2011 | Sommer et al. |
| 8,020,073 B2 | 9/2011 | Emma et al. |
| 8,108,590 B2 | 1/2012 | Chow et al. |
| 8,122,328 B2 | 2/2012 | Liu et al. |
| 8,159,881 B2 | 4/2012 | Yang |
| 8,190,961 B1 | 5/2012 | Yang et al. |
| 8,250,324 B2 | 8/2012 | Haas et al. |
| 8,300,823 B2 | 10/2012 | Bojinov et al. |
| 8,305,812 B2 | 11/2012 | Levy et al. |
| 8,327,246 B2 | 12/2012 | Weingarten et al. |
| 8,407,560 B2 | 3/2013 | Ordentlich et al. |
| 8,417,893 B2 | 4/2013 | Khmelnitsky et al. |
| 2001/0034815 A1 | 10/2001 | Dugan et al. |
| 2002/0063774 A1 | 5/2002 | Hillis et al. |
| 2002/0085419 A1 | 7/2002 | Choi et al. |
| 2002/0154769 A1 | 10/2002 | Petersen et al. |
| 2002/0156988 A1 | 10/2002 | Toyama et al. |
| 2002/0174156 A1 | 11/2002 | Birru et al. |
| 2003/0014582 A1 | 1/2003 | Nakanishi |
| 2003/0065876 A1 | 4/2003 | Lasser |
| 2003/0101404 A1 | 5/2003 | Zhao et al. |
| 2003/0105620 A1 | 6/2003 | Bowen |
| 2003/0177300 A1 | 9/2003 | Lee et al. |
| 2003/0192007 A1 | 10/2003 | Miller et al. |
| 2004/0015771 A1 | 1/2004 | Lasser et al. |
| 2004/0030971 A1 | 2/2004 | Shibata et al. |
| 2004/0059768 A1 | 3/2004 | Denk et al. |
| 2004/0080985 A1 | 4/2004 | Chang et al. |
| 2004/0153722 A1 | 8/2004 | Lee |
| 2004/0153817 A1 | 8/2004 | Chevallier et al. |
| 2004/0181735 A1 | 9/2004 | Xin |
| 2004/0203591 A1 | 10/2004 | Lee |
| 2004/0210706 A1 | 10/2004 | In et al. |
| 2005/0013165 A1 | 1/2005 | Ban |
| 2005/0018482 A1 | 1/2005 | Cemea et al. |
| 2005/0083735 A1 | 4/2005 | Chen et al. |
| 2005/0117401 A1 | 6/2005 | Chen et al. |
| 2005/0120265 A1 | 6/2005 | Pline et al. |
| 2005/0128811 A1 | 6/2005 | Kato et al. |
| 2005/0138533 A1 | 6/2005 | Le-Bars et al. |
| 2005/0144213 A1 | 6/2005 | Simkins et al. |
| 2005/0144368 A1 | 6/2005 | Chung et al. |
| 2005/0169057 A1 | 8/2005 | Shibata et al. |
| 2005/0172179 A1 | 8/2005 | Brandenberger et al. |
| 2005/0213393 A1 | 9/2005 | Lasser |
| 2005/0243626 A1 | 11/2005 | Ronen |
| 2006/0059406 A1 | 3/2006 | Micheloni et al. |
| 2006/0059409 A1 | 3/2006 | Lee |
| 2006/0064537 A1 | 3/2006 | Oshima |
| 2006/0101193 A1 | 5/2006 | Murin |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes et al. |
| 2006/0294312 A1 | 12/2006 | Walmsley |
| 2007/0025157 A1 | 2/2007 | Wan et al. |

(56) References Cited

U.S. PATENT DOCUMENTS

| | | |
|---|---|---|
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Sokolov et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |

(56) References Cited

U.S. PATENT DOCUMENTS

| | | | |
|---|---|---|---|
| 2012/0124273 A1 | 5/2012 | Goss et al. | |
| 2012/0246391 A1 | 9/2012 | Meir et al. | |
| 2013/0013844 A1* | 1/2013 | Venkatesh et al. | 711/6 |

OTHER PUBLICATIONS

Search Report of PCT Patent Application WO 2009/095902 A3, Mar 4, 2010.
Search Report of PCT Patent Application WO 2009/078006 A3, Mar 4, 2010.
Search Report of PCT Patent Application WO 2009/074979 A3, Mar 4, 2010.
Search Report of PCT Patent Application WO 2009/074978 A3, Mar 4, 2010.
Search Report of PCT Patent Application WO 2009/072105 A3, Mar 4, 2010.
Search Report of PCT Patent Application WO 2009/072104 A3, Mar 4, 2010.
Search Report of PCT Patent Application WO 2009/072103 A3, Mar 4, 2010.
Search Report of PCT Patent Application WO 2009/072102 A3, Mar 4, 2010.
Search Report of PCT Patent Application WO 2009/072101 A3, Mar 4, 2010.
Search Report of PCT Patent Application WO 2009/072100 A3, Mar 4, 2010.
Search Report of PCT Patent Application WO 2009/053963 A3, Mar 4, 2010.
Search Report of PCT Patent Application WO 2009/053962 A3, Mar 4, 2010.
Search Report of PCT Patent Application WO 2009/053961 A3, Mar 4, 2010.
Search Report of PCT Patent Application WO 2009/037697 A3, Mar 4, 2010.
Yani Chen, Keshab K. Parhi, "Small Area Parallel Chien Search Architectures for Long BCH Codes", Ieee Transactions on Very Large Scale Integration( VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-72 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com), Oct. 2005.
Todd K.Moon, "Error Correction Coding Mathematical Methods and Algorithms", A John Wiley & Sons, Inc., 2005.
Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1, Feb. 2005.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com , 2005.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26, Dec. 2007.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

\* cited by examiner

Determining a threshold that represents a number of data segments to be written to the buffer between an execution of two consecutive merge fragments such as to prevent an overflow of the buffer due to an execution of a merging of all data sectors currently buffered and a reception of new data sectors during the merging of all data sectors currently buffered. 251

Determining of the threshold in response to at least some (and even to all) of the following parameters: NF, NP, Sgap, NU, (L(1) – L(NU)), f and Q 252

Calculating equation 253

Triggering an execution of at least one merge fragment if a number of data sectors written to the buffer since a last merge fragment reaches or exceeds a threshold. 254

Triggering an execution of at least one merge fragment of a certain memory space portion if a merger related to the certain memory space portion may be urgent. 255

Executing multiple merge fragments. 258

Managing a first management data structure, a second management data structure and a third management data structure. 231

Creating pointers in the first management data structure, for each data sector corresponding to an associated memory space portion and a storage location of the data sector in the buffer. 232

Updating the second management data structure to reflect, for each memory space portion, a buffer block that stores an earliest written data sector of the memory space portion. 233

Updating the third management data structure to reflect a number of primary memory space portions per buffer block; wherein a primary memory space portion of a buffer block is a memory space portion of which an earliest written data sector that is still buffered was written to the buffer block. 234

Suggesting a merge candidate. 235

230

FIG. 11

ORDERED MERGE OF DATA SECTORS THAT BELONG TO MEMORY SPACE PORTIONS

RELATED APPLICATIONS

This application is a continuation in part of U.S. patent application Ser. No. 13/859,497, filing date Apr. 9, 2013, titled "ADVANCED MANAGEMENT OF A NON-VOLATILE MEMORY," which is a continuation in part of U.S. patent application Ser. No. 13/434,083, filing date Mar. 29, 2012, titled "SYSTEM AND METHOD FOR FLASH MEMORY MANAGEMENT," which claims priority from U.S. provisional patent Ser. No. 61/485,397 filing date May 12, 2011, all applications are incorporated herein by reference.

BACKGROUND OF THE INVENTION

Flash memory devices store information with high density on Flash cells with ever smaller dimensions. In addition, Multi-Level Cells (MLC) store several bits per cell by setting the amount of charge in a cell. Flash memory devices are organized into (physical) pages. Each page includes a section allocated for data (512 bytes-8 Kbytes and expected larger in the future) and a small amount of spare bytes (64-512 or more bytes for every page) for storing redundancy and metadata. The redundancy bytes are used to store error-correcting information, for correcting errors, which may have occurred during flash lifetime, and the page read process. Each program operation is performed on an entire page. A number of pages are grouped together to form an Erase Block (erase block). A page cannot be erased unless the entire erase block, which contains it is erased.

Various common applications of flash memory devices are Secure Digital (SD) cards and embedded Multi-Media Cards (eMMC). An SD or eMMC card may typically contain flash memory devices and a flash memory controller. The controller translates commands coming in through the SD/eMMC interface into actions (Read/Write/Erase) on the flash memory devices. The most common SD/eMMC commands may be Read and Write commands of one or more sectors, where a sector may be, but is not limited to, a sequence of 512 bytes. The Read or Write commands may be of a single sector or multiple sectors. These commands may refer to logical addresses. These addresses may then be redirected to new addresses on the flash memory which need not directly correspond to the logical addresses that might be referenced by the Read or Write commands. This is due to memory management that may be carried out by the flash memory controller in order to support several features such as wear-leveling, bad block management, firmware code and data, error-correction, and others. The erase function is performed on an entire erase block. Because of this functionality, before the data of a certain block may be replaced such as during a write function, the new data must be written in an alternative location before an erase can occur, to preserve the integrity of the stored data.

Due to the small dimensions of a typical SD/eMMC card and the price limitations, the controller may typically have only a small RAM available for storage. The small size of the RAM memory limits the type of memory management which may be carried out by the controller with regard to the data stored in the flash memory device and received from the interface.

The controller may typically manage the memory at the erase block level, because managing data of small particle sizes may require larger management data structures than can be supported by relatively slam embedded RAM memory modules. That is, the logical memory space may be divided into units of memory contained within a single erase block or some constant multiple of erase blocks, such that all logical sector addresses within each said unit of memory may be mapped to the same erase block or some constant multiple thereof.

This type of management has the drawback that for writing random access data sectors to memory or other memory units smaller than an erase block, erase blocks must be frequently rewritten. Because of the characteristics of flash memory, each new piece of information is written into an empty page. In flash memory, a page may not be rewritten before the entire erase block is erased first.

If a portion of the memory unit contained within an erase block may need to be rewritten, it is first written into a freshly allocated erased erase block. The remaining, unmodified, contents of the erase block may then be copied into the new erase block and the former erase-block may be declared as free and may be further erased. This operation may be referred to as "sealing" or "merging". The operation involves collecting the most recent data of a logical block and then merging it with the rest of the block data in a single erase block. Thus, even if a single sector from an erase block is rewritten, a complete erase block would be rewritten.

This may result in causing a significant degradation in the average write speed. It may also impose a significant delay in the response time between random write sector operations. It also may cause excessive P/E (program/erase) cycling, which may be problematic in new generations of flash memory devices where the number of P/E cycles is limited to a few thousand or even a few hundreds.

Various types of management schemes can be executed by an embedded memory controller. The memory controller should always keep track of the data associated with each logical address and the actual memory location. This is usually achieved by implementing a mapping method between the logical address space assigned to the data and the actual memory storage location of the data.

The embedded memory controller may implement several methods to execute such a mapping. Two approaches implement mapping systems that rely on block mapping and page mapping, respectively. In an approach using block mapping, each physical block in the flash memory is mapped to a contiguous logical memory block of the same data size. In this approach when one page in some logical block is updated, the entire associated physical block must be copied to a fresh block, and the new data must be written in place of the obsolete copy. A merge may be an operation where the original content of a logical block is merged with the new data to form a new up to date copy of the block. This up to date copy is the buffer block that is associated with a logical buffer block assigned to the data contained within. In the second approach, each logical page of a logical block is mapped to an arbitrary physical page where two pages belonging to the same logical block can reside in different physical blocks of the flash memory. The second approach requires additional complexity in terms of the amount of management data and memory overhead required for the physical memory to logical address mapping tables. For memory applications where severe limitations exist on available control memory, this approach is less appropriate. Flash memories such as SD/eMMC have limited amount of memory and the first mapping approach, or variants thereof are more practical.

SUMMARY

According to an embodiment of the invention there is provided a method of managing a non-volatile memory device, the method may include receiving data sectors; wherein each data sector belongs to a memory space portion out of multiple memory space portions; writing the data sectors into a buffer of the non-volatile memory device; wherein the buffer may include multiple buffer blocks; maintaining at least one management data structure that may include (a) location metadata about a location of each data sector in the buffer (b) timing metadata for each memory space portion that includes at least one data sector that may be currently buffered in the buffer, wherein timing metadata related to a memory space portion may be indicative of a timing of an earliest writing to the buffer of any currently buffered data sector that belongs to the memory space portion; selecting a selected buffer block in response to the location metadata and the timing metadata; wherein the selected buffer block stores at least one certain data sector of at least one certain memory space portion; and merging, before the buffer becomes full, data sectors of all of the at least one certain memory space portion into a sequential portion of the non-volatile memory device thereby emptying the selected buffer block, wherein the sequential portion differs from the buffer.

The at least one certain memory space portion may include multiple certain memory space portions; wherein the method may include merging data sectors of the multiple certain memory space portions according to a certain memory space portion merger order.

The selecting may be responsive to urgency attribute values associated with memory space portions.

The selected buffer block may be an oldest buffer block of the buffer; wherein the oldest buffer block stores an earliest written data sector out of all data sectors currently buffered in the buffer.

The merging may be responsive to a size of a residual buffer space that may be allocated for receiving data sectors during an execution of the merging.

The size of the residual buffer space may be fixed.

The size of the residual buffer space may equal a ratio between (b) a number of memory space portions of the multiple memory space portions, and (b) a number of buffer blocks.

The merging may include executing multiple merge fragments.

The method may include determining a threshold that represents a number of data segments to be written to the buffer between an execution of two consecutive merge fragments such as to prevent an overflow of the buffer due to an execution of a merging of all data sectors currently buffered and a reception of new data sectors during the merging of all data sectors currently buffered.

The method may include determining the threshold whenever a buffer block may be filled.

The determining of the threshold may be responsive to a size of a residual buffer space that may be allocated for receiving data sectors during an execution of the merging.

The size of the residual buffer space may be fixed.

The determining of the threshold may be responsive to at least some parameters out of: a number (NF) of empty buffer blocks, a number (NP) of data sectors required to fill a buffer block, a size (Sgap) of residual buffer space that may be allocated for receiving data sectors during an execution of the merging; a number (NU) of buffer blocks that are not empty; numbers (L(1)-L(NU)) of primary memory space portions per each buffer block; wherein a primary memory space portion of a buffer block may be a memory space portion of which an earliest written data sector that may be still buffered was written to the buffer block; a number (f) of merge fragments required for completing a merging that empties the selected buffer block; and a number (Q) of uncompleted merge fragments requires for a completion of a merging process that may be executed when the determining of the threshold may be calculated.

The determining of the threshold may be responsive to NF, NP, Sgap, NP, NU, L(1)-L(NU), f and Q.

The calculating of the threshold (P) may include: for each value of an index j that ranges between 1 and NU: calculating a first intermediate value that equals (NF+j−1)*NP−Sgap); calculating a second intermediate value that equals a sum, over an index k that ranges between 1 and j, of (L(k)*f−Q); dividing the first intermediate value by the second intermediate value to provide a third intermediate value; selecting the threshold to equal a minimal third intermediate value out of all intermediate third values calculated for different values of index j.

The method may include triggering an execution of at least one merge fragment if a number of data sectors written to the buffer since a last merge fragment reaches or exceeds a threshold.

The method may include triggering an execution of at least one merge fragment of a certain memory space portion if a merger related to the certain memory space portion may be urgent.

The at least one data structure may include a first management data structure, a second management data structure and a third management data structure; wherein the maintaining of the at least one data structure may include: creating pointers in the first management data structure, for each data sector corresponding to an associated memory space portion and a storage location of the data sector in the buffer; updating the second management data structure to reflect, for each memory space portion, a buffer block that stores an earliest written data sector of the memory space portion; and updating the third management data structure to reflect a number of primary memory space portions per buffer block; wherein a primary memory space portion of a buffer block may be a memory space portion of which an earliest written data sector that may be still buffered was written to the buffer block;

The method may include: scanning the second management data structure; updating a first merge candidate list with memory space portion indices which are marked in the second management data structure as urgent; updating a second merge candidate list with memory space portion indices which are associated in the second management data structure to an oldest buffer block; wherein the oldest buffer block stores an earliest written data sector out of all data sectors currently buffered in the buffer; searching the first merge candidate list for an existing merge candidate; and searching the second merge candidate for an existing merge candidate, if the first merge candidate list may be empty.

The method may include updating at least one of the second and third management data structures whenever a data sector from a memory space portion may be written to the buffer for a first time or when a memory space portion may be merged.

According to an embodiment of the invention there may be provided system for managing a non-volatile memory device, the system may include: an interface that may be arranged to receive data sectors; wherein each data sector belongs to a memory space portion out of multiple memory space portions; a memory controller that may be arranged to: write the data sectors into a buffer of the non-volatile memory device; wherein the buffer may include multiple buffer blocks; maintain at least one management data structure that may include (a) location metadata about a location of each data sector in the buffer (b) timing metadata for each memory space portion that includes at least one data sector that may be currently buffered in the buffer, wherein timing metadata related to a memory space portion may be indicative of a timing of an earliest writing to the buffer of any currently buffered data sector that belongs to the memory space portion; select a selected buffer block in response to the location metadata and the timing metadata; wherein the selected buffer block stores at least one certain data sector of at least one certain memory space portion; and merge, before the buffer becomes full, data sectors of all of the at least one certain memory space portion into a sequential portion of the non-volatile memory device thereby emptying the selected buffer block, wherein the sequential portion differs from the buffer.

According to an embodiment of the invention there may be provided a non-transitory computer readable medium that stores instruction for managing a non-volatile memory device, the instructions, once executed by a computer cause the computer to perform the stages of: receiving data sectors; wherein each data sector belongs to a memory space portion out of multiple memory space portions; writing the data sectors into a buffer of the non-volatile memory device; wherein the buffer may include multiple buffer blocks; maintaining at least one management data structure that may include (a) location metadata about a location of each data sector in the buffer (b) timing metadata for each memory space portion that includes at least one data sector that may be currently buffered in the buffer, wherein timing metadata related to a memory space portion may be indicative of a timing of an earliest writing to the buffer of any currently buffered data sector that belongs to the memory space portion; selecting a selected buffer block in response to the location metadata and the timing metadata; wherein the selected buffer block stores at least one certain data sector of at least one certain memory space portion; and merging, before the buffer becomes full, data sectors of all of the at least one certain memory space portion into a sequential portion of the non-volatile memory device thereby emptying the selected buffer block, wherein the sequential portion differs from the buffer.

BRIEF DESCRIPTION OF THE DRAWING

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 10 illustrates a stage of the method of FIG. 9 according to an embodiment of the invention;

FIG. 11 illustrates a stage of the method of FIG. 9 according to an embodiment of the invention.

Figure 1:
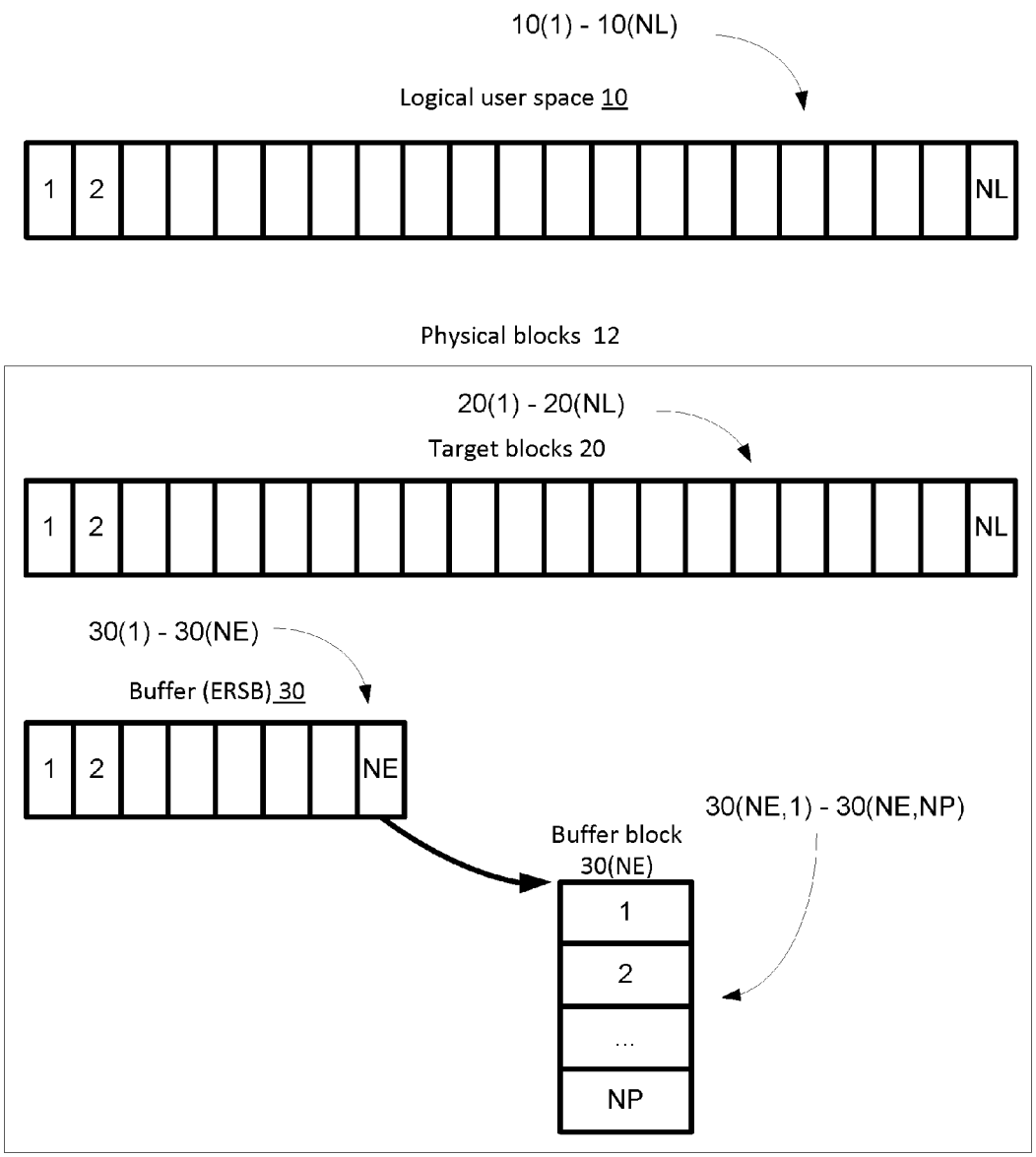
FIG. 1 illustrates various memory spaces and a buffer according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

U.S. patent application Ser. No. 13/434,083, filing date Mar. 29, 2012, titled "SYSTEM AND METHOD FOR FLASH MEMORY MANAGEMENT", which is incorporated herein by reference, teaches of a buffer such as an extended random sector buffer (ERSB) which is used in Flash storage systems employing block mapping to mitigate the need to perform block merge for every input sector, when writing sectors to random logical addresses. The ERSB is a collection of candidate buffer blocks which may hold short random write transactions until a later stage when the data of these transactions may be merged to their original logical blocks. When writing short random transactions to a memory space (target area) the data of those transactions may be written contiguously to ERSB buffer blocks. A special database may map each logical portion written to the ERSB to a corresponding physical location in the ERSB. When the ERSB becomes close to full, block merges may be performed for all logical blocks which have pages in the ERSB until some or all of the buffer blocks are freed.

When writing short random write transactions (e.g., 512 B, 4 KB), the performance may be initially high and may be determined primarily by the write speed supported by the flash array and the transfer speed of the host interface. As the ERSB becomes more and more occupied, it may be necessary to vacate some of its blocks, so future writes could be accomplished. Since each buffer block in the ERSB may potentially have pages from all the logical blocks in a memory space (also referred to as test area), in order to vacate even a single buffer block, it is required to merge almost all of the logical blocks. The merges may require a substantial amount of time, rendering the throughput to be much lower during this time. This situation continues until at least one buffer block is freed, and then high throughput may be restored again. It is readily seen that in such a scenario, the random write performance may fluctuate repeatedly between high and low values, causing a poor user experience.

During the merge period described above, which is intended to free buffer blocks in order to make room for new incoming transactions, incoming writes may still be performed to the ERSB. Once the merge process begins, the time allowed for processing each transaction is used for both writing the transaction to the ERSB and for performing part of the merge. For this reason, it is necessary to keep enough spare room for writing all the incoming transactions, until the merge process completes and buffer blocks are freed. The amount of pages which may be left for this purpose depends on the time required to complete all the merges. This time may be proportional to the number of logical memory block (LBAs) which have data in the ERSB at the time the merge process begins. The pages which are left available for the purpose described above are called safety gap pages, or safety gap, or just gap. The time allotted from the total transaction processing time for performing merge is called merge fragment time or simply merge fragment.

A way for circumventing the IOPS fluctuations may be provided in which block merges may be performed at a controlled rate long before the ERSB becomes full. Specifically, a merge fragment may be carried out every time a fixed amount of pages is written to the ERSB. The fixed amount of pages (called page period or just period) may be calculated as a function of the ERSB size, the test area, and the merge time. For example, if the ERSB size is e.g. 100,000 pages large, and if writes are done over a test area of e.g. 50 LBAs, and if the merge duration is e.g. 20 merge fragments long, then after each 100,000/50/20=100 pages are written to the ERSB, one merge fragment may be performed. In this way, a buffer block which has just become full may be freed once the entire ERSB is written over again. In other words, when the ERSB reaches a steady state, an old buffer block may become free just before a new buffer block is needed to host new incoming transactions.

The merge rate which is chosen may take into consideration the safety gap. Specifically, the merge rate may be computed after subtracting the gap from the ERSB size. This ensures that the safety gap may usually be kept available and never used, unless in rare circumstances. Since the gap is set according to the time required to merge the entire test area, the size of the safety gap might limit the effective size of the ERSB and this in turn might limit the level of IOPS achieved by the system. It is desirable to keep the safety gap as small as possible in order to maximize the IOPS.

The LBAs may be selected for merge according to a predetermined order. For example, all the LBAs in the user space may be arbitrarily ordered, and LBAs from the test area may be chosen according to that order. When the test area is changing, however, it may occur that buffer blocks are not freed in time before they are needed to host new incoming writes, and the system might have no room to write incoming data, leading to system failure.

To see how this can happen, assume that the merge order is lexicographic, i.e. LBA1, LBA2, ... etc. Next, assume that the test area comprises initially the first 10 LBAs. The safety gap used by certain embodiments of the previous invention may comprise only enough pages to accommodate merging of 10 LBAs. Assume that the test area suddenly changes to LBAs 11-1000, and that the last LBA which was merged before the test area changed was LBA 10. Since the merge order is lexicographic, the next merges which will be done are 11-1000. However, almost the entire buffer blocks in the ERSB are full with pages from LBAs 1-10. It follows that a 1000 merges might be required before any buffer blocks may be freed. Since the safety gap can only allow merging of 10 LBAs, the system might fail, due to insufficient space to write incoming data.

FIG. 1 depicts a storage system spanning a logical user space 10 of NL logical blocks (LBAs) 10(1)-10(NL). These NL logical blocks are mapped to a physical storage space (target area) 20 that include NL target blocks 20. The LBAs are an example of memory space portions.

The storage system includes a buffer 30 (such as an ERSB) that includes NE buffer blocks 30(1)-30(NE), each buffer block (such as 30(NE)) is able to accommodate NP pages of size (e.g., 4 KB) such as 30(NE,1)-30(NE,NP).

It should be noted that f represents the number of merge fragments required to complete a block merge.

In certain embodiments of the present invention, short random write transactions may be written to the buffer.

Figure 2:
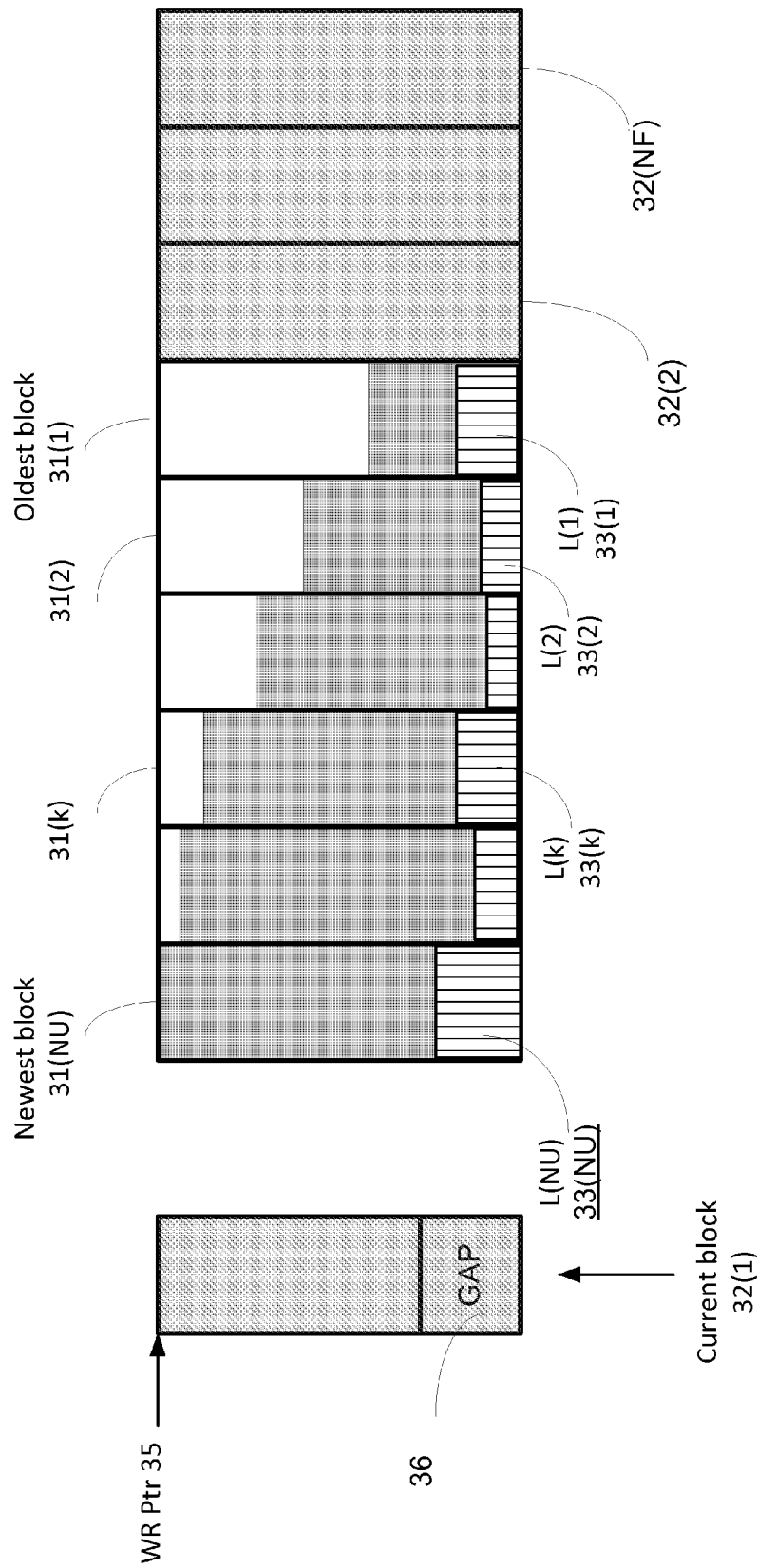
FIG. 2 illustrates a state of a buffer according to an embodiment of the invention.

FIG. 2 shows the state of the buffer 30 after some data sectors were written to it according to an embodiment of the invention. The data sectors are written to the buffer in a sequential manner-filling one buffer block after the other.

FIG. 2 illustrates two types of buffer blocks—empty buffer blocks 32(1)-32(NF) and non-empty buffer blocks 31(1)-31(NU) which are ordered according to their age—31(1) being the oldest—it stores the data sectors that has the earliest writing time out of all the data sectors currently buffered in the buffer.

A non-empty buffer blocks stores at least one valid data page and possibly have one or more superseded pages. The empty buffer blocks may also be referred to as unused or free.

It is noted that buffer blocks 30(1)-30(NE) in FIG. 1 are the same buffer blocks as those illustrated in FIG. 2 (32(1)-32(NF) and 31(1)-31(NU)) and that the different reference numbers provided in FIG. 2 reflect a separation of the data blocks to empty and non-empty buffer blocks as well as an ordering of the non-empty buffer blocks.

FIG. 2 also illustrates an empty buffer block 32(1) that is referred to as a current buffer block as it is the buffer block that should receive the next received data sectors. WR Ptr 35 is a pointer which may be used to point to the next available empty page in the newly allocated buffer block. The current buffer block also includes a residual buffer space (GAP 36) that is allocated for receiving data sectors during an execution of the merging, if for some reason, the system was unable to complete the pending merges by the time a new data block was needed.

The indices 1, 2, . . . , NU of non-empty buffer blocks 31(1)-31(NU) may reference the used buffer blocks according to their age, i.e. for j=1, 2, . . . , NU−1, buffer block j was written prior to buffer blocks j+1, j+2, . . . , NU. Each buffer block may have pages from one or more memory space portions.

A memory space portion is said to be a primary memory space portion of some buffer block if the first page written to the buffer from said memory space portion was written to said buffer block. The number of primary memory space portions of each of the used buffer blocks is denoted by L(k), wherein index k ranges between 1 and NU. For example, L(NU), L(k), L(2) and L(1) are denoted 33(NU), 33(k), 33(2) and 33(1) respectively.

NF=NE−NU is the number of free buffer blocks which do not contain any valid data including the current buffer block which may contain valid data.

In one embodiment of the present invention, the value L(1) 33(1) may be equal to the number of the memory space portions with valid pages in the oldest buffer block.

In some embodiments of the present invention, once a buffer block becomes totally superseded, it becomes free, and the oldest buffer block becomes the block which was second oldest prior to the freeing of the said block.

In one embodiment of the present invention, a threshold called P may be selected and used as follows. Each P pages written to the buffer, a merge fragment may be performed. Whenever a merge of one memory space portion is complete, another merge of another memory space portion may commence.

In one embodiment of the present invention, when a new merge is to be started, the memory space portion chosen for the merge may be taken as one of the memory space portions which have valid pages in the oldest buffer block.

Figure 3:
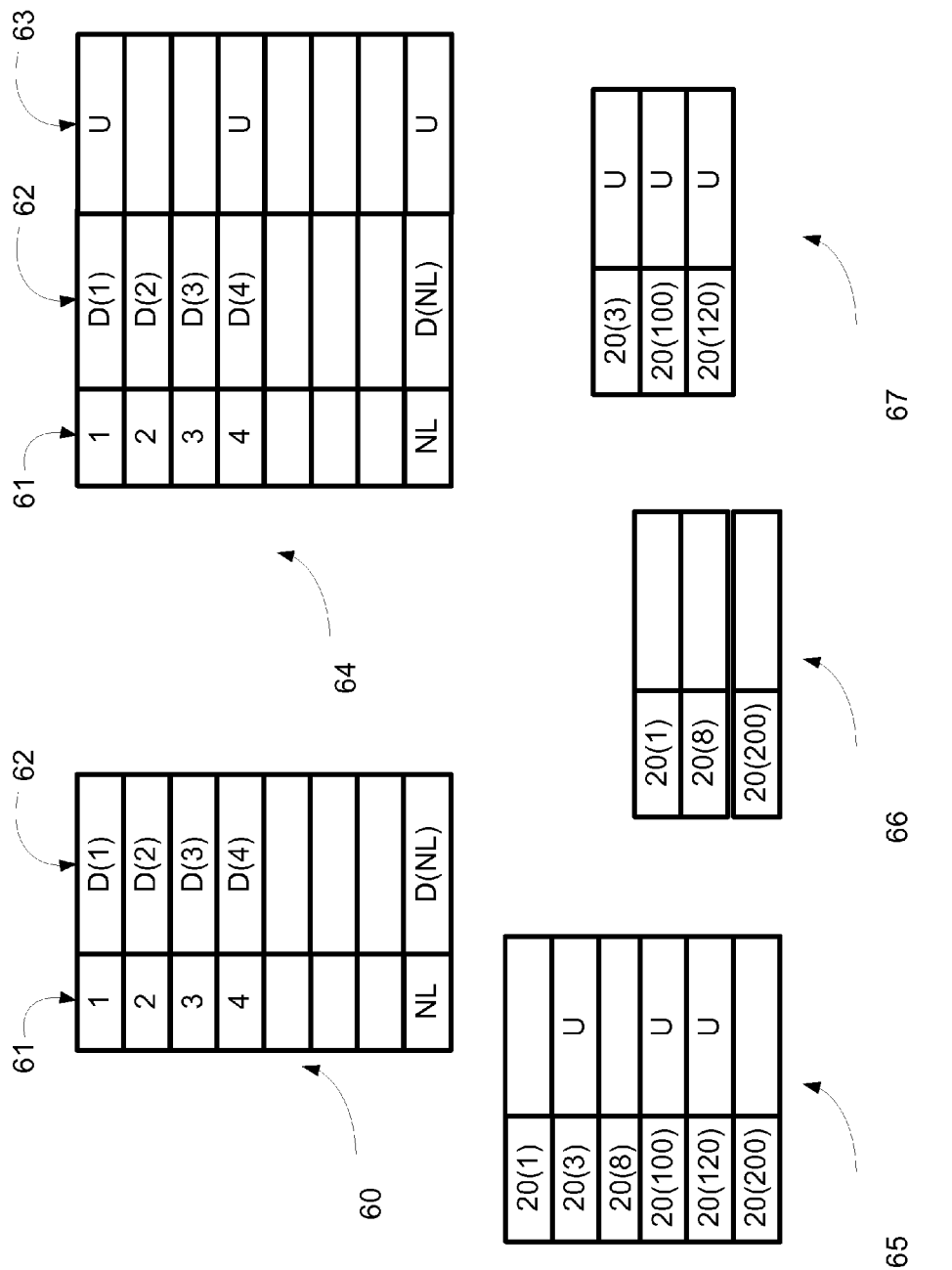
FIG. 3 illustrates management data structures according to an embodiment of the invention.

In one embodiment of the present invention, a table of primary memory space portions may be used to select the memory space portions for merge. FIG. 3 illustrates table 60 that includes a first column 61 and a second column 62 each of NL entries. Column 61 includes memory space portions indexes and column 62 includes indexes of buffer blocks.

The table 60 provides a mapping between an index (ranges between 1 and NL) of memory space portion and between an index buffer block that stores the earliest written data sector (currently buffered) of that memory space portion. FIG. 3 illustrates that column 62 may include indexes D(1)-D(NL) and their values may range between 1 and NE.

Whenever a data sector belonging to some memory space portion is written to the buffer for the first time, the value in the table corresponding to the said memory space portion may be updated to the index of the buffer block to which the sector was written. Whenever a memory space portion is merged, the value of the entry corresponding to this memory space portion may be set to a special value (e.g. NOT_EXIST) which indicates that no data sector from the given memory space portion exists in the buffer.

In one embodiment of the present invention, each time a new merge is required, the table of primary memory space portions is scanned from beginning to end until a memory space portion is found whose entry value equals the index of the oldest buffer block. When such memory space portion is found, a merge of this memory space portion may then be performed.

In one embodiment of the present invention, a candidate data structure (denoted 65 in FIG. 3) is used to accumulate several merge candidates. FIG. 3 illustrates table 65 as including candidates such as memory space portions 20(1), 20(3), 20(8), 20(100), 20(120) and 20(200) out of which memory space portions 20(3), 20(100) and 20(120) are urgent.

When the data structure becomes empty, the table 60 of primary memory space portions is scanned, and all memory space portions whose entry value equals the oldest buffer block are inserted to the candidate data structure 65. When a new merge is required, the next memory space portion in the candidate data structure 65 is used for the merge, and its value removed from the candidate data structure.

In one embodiment of the present invention, the table 60 of primary memory space portions may be used to designate memory space portions who require that a merge be done to them as quickly as possible, i.e. before any other memory space portion is merged, and as fast as possible, i.e., by performing merge fragments continuously until the merge is complete. Such memory space portions are said to require an urgent merge. FIG. 3 also illustrates table 64 that resembles table 60 but includes a third column 63 that stores urgency indications. The urgency indication can be binary (urgent/non-urgent) or may include multiple (more than two) urgency levels. FIG. 3 shows some memory space portions as being urgent ('U') while other memory space portions are not urgent (empty entry).

In this embodiment, the controller of the storage system may decide that a memory space portion requires an urgent merge, and in such a case, it may designate this by setting the value of the memory space portion's entry in the table to e.g., URGENT.

In one embodiment of the present invention, the candidate data structure 65 may include two candidate data structures 66 and 67. Each of these candidate data structures 66 and 67 may contain merge candidates. The first candidate data structure 66 may contain standard merge candidates which are primary memory space portions of the oldest buffer block. The second candidate data structure 67 may contain merge candidates whose merger is urgent. FIG. 3 illustrates the first candidate data structure 66 as including non-urgent memory space portions 20(1), 20(8) and 20(200) and the second candidate data structure 67 as including urgent memory space portions 20(3), 20(100) and 20(120).

In one embodiment of the present invention, while scanning the table 60 of primary memory space portions, memory space portions which are marked as urgent are added to the second candidate data structure 67, while memory space portions which are primary memory space portions of the oldest buffer block are added to the first candidate data structure 66. In this embodiment, when a merge is required, the second candidate data structure 67 may be checked first, and if it contains merge candidates, a merge of one of these candidates may be next performed. If the urgent data structure is empty, a merge candidate may be taken from the first candidate data structure 66.

In one embodiment of the present invention, the threshold P may be calculated every time a new buffer block is allocated for writing and WR Ptr is set to 0.

In one embodiment of the present invention, when a merge is in progress, after every page which is received from the host and written to the buffer, a certain amount of time is used to perform a merge fragment.

In one embodiment of the present invention, a linked list may be used to store the values L(k). Each element in the linked list may hold the index of the buffer block, the amount of primary memory space portions associated to this buffer block and a pointer to the next element in the linked list.

In one embodiment of the present invention, the period p may be calculated by the following equation:

$$P = \min_{1 \le j \le NU} \left( \frac{(NF + j - 1) * NP - Sgap}{\sum_{k=1}^{j} L(k) * f + Q} \right)$$

Where NF, NP, L(k), and f are as described above, Sgap is the overall size of pages used as a safety gap as described above, and Q is the number of additional merge fragments required to complete the merge which is currently ongoing at the time when the calculation of P is performed.

Sgap can be a number indicative of a number of pages that should be included in the safety gap.

In one embodiment of the present invention, Sgap may be obtained by dividing the number of logical blocks in the storage system by the number of buffer blocks in the buffer.

Figure 4:
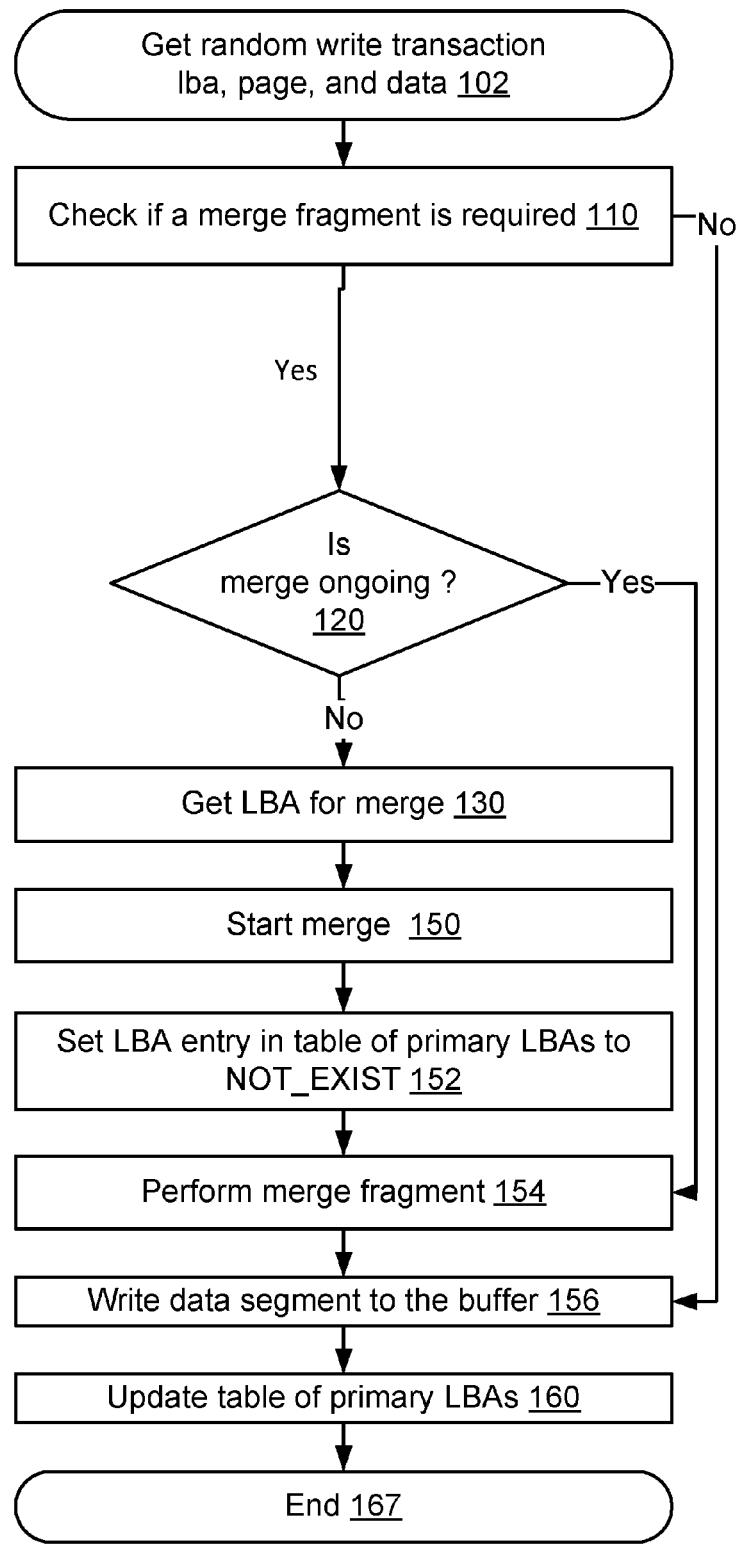
FIG. 4 illustrates a method according to an embodiment of the invention.
Figure 5:
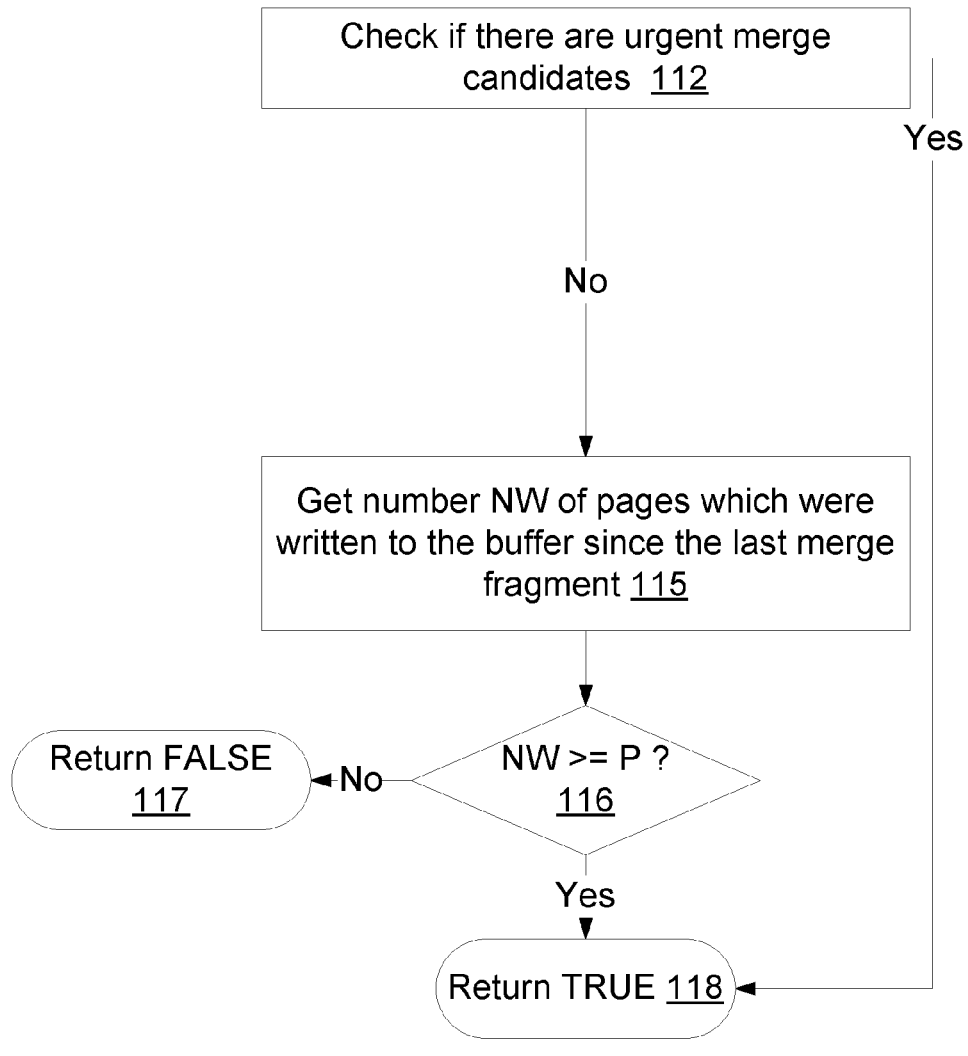
FIG. 5 illustrates a stage of the method of FIG. 4 according to an embodiment of the invention.

In one embodiment of the present invention, the computation of P may be implemented by the following pseudo code:
1. Initialize j=1
2. Initialize sumPages=NF*NP−Sgap
3. Initialize sumMergeFrags=Q
4. Set P=inf
5. for j=1 to NU
 a. sumPages=sumPages+(j−1)*NP
 b. sumMergeFrags=sumMergeFrags+L(j)
 c. P=min(P, sumPages/sumMergeFrags)
6. end In one embodiment of the present invention, in order to save unnecessary division operations and speed up performance, the following pseudo code may be used.
 1. Initialize j=1
 2. Initialize sumPages=NF*NP−Sgap
 3. Initialize sumMergeFrags=Q
 4. Set s=inf
 5. for j=1 to NU:
 a. sumPages=sumPages+(j−1)*NP
 b. sumMergeFrags=sumMergeFrags+L(j)
 c. If ((L(j)>0)&&(j>1))
  P=min(P, sumPages/sumMergeFrags)
6. end
7. end FIG. 4 illustrates method 100 according to an embodiment of the invention.

In the following figures the memory space portions are logical address blocks (LBAs).

Method 100 starts by stage 102 of get random write transaction, LBA, page, and data (the data to be stored in said page in said LBA).

Stage 102 is followed by stage 110 of checking if a merge fragment is required. If yes—jumping to query stage 120. If no—jumping to stage 156 of writing a data segment to the buffer.

Query stage 120 includes checking if a merge is ongoing. If yes-jumping to stage 154 of performing a merge segment. If no—jumping to stage 130 of getting an LBA to merge.

Stage 130 is followed by stage 150 of starting a merge.

Stage 150 is followed by a sequence of stages 152, 154, 156, 160 and END stage 167.

Stage 152 includes setting LBA entry in table of primary LBAs to NOT_EXIST

Stage 154 includes performing a merge segment

Stage 156 includes writing a data segment to the buffer.

Stage 160 includes updating the table (60) of primary LBAs.

FIG. 1 illustrates stage 110 of method 100 according to an embodiment of the invention.

Stage 110 starts by stage 112 of Check if there are urgent merge candidates.

If yes—jumping to query stage 118 of return TRUE. If no—jumping to stage 115 of getting a number NW of pages which were written to the buffer since the last merge fragment.

Stage 115 is followed by query stage 116 of checking if NW equals to P or exceeds P.

If yes—jumping to query stage 118 of return TRUE. If no—jumping to stage 117 of return FALSE.

Figure 6:
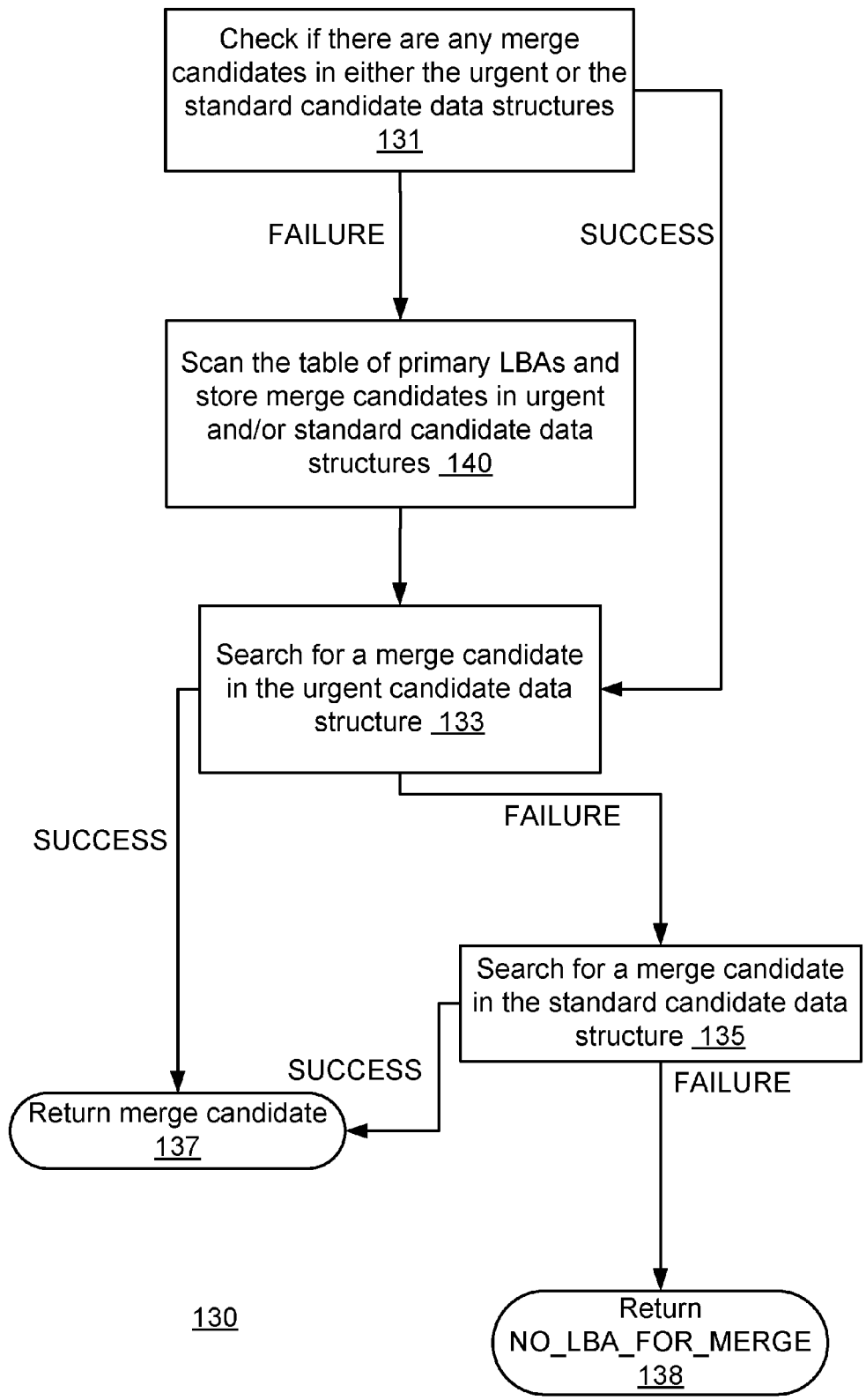
FIG. 6 illustrates a stage of the method of FIG. 4 according to an embodiment of the invention.

FIG. 6 illustrates stage 130 of method 100 according to an embodiment of the invention.

Stage 130 starts by stage 131 of checking if there are any merge candidates in either the urgent or the standard candidate data structures.

If there is a merge candidate (success) jump to stage 133 and if there is no merge candidate (failure) jump to stage 140.

Stage 140 is followed by stage 133.

Stage 133 includes searching for a merge candidate in the urgent candidate data structure. If succeeding jump to stage 137 of returning a merge candidate. Else—jump to stage 135.

Stage 135 includes searching for a merge candidate in the normal candidate data structure. If succeeding jump to stage 137 of returning a merge candidate. Else—jump to stage 138 of announcing a failure—return NO_LBA_FOR_MERGER.

Figure 7:
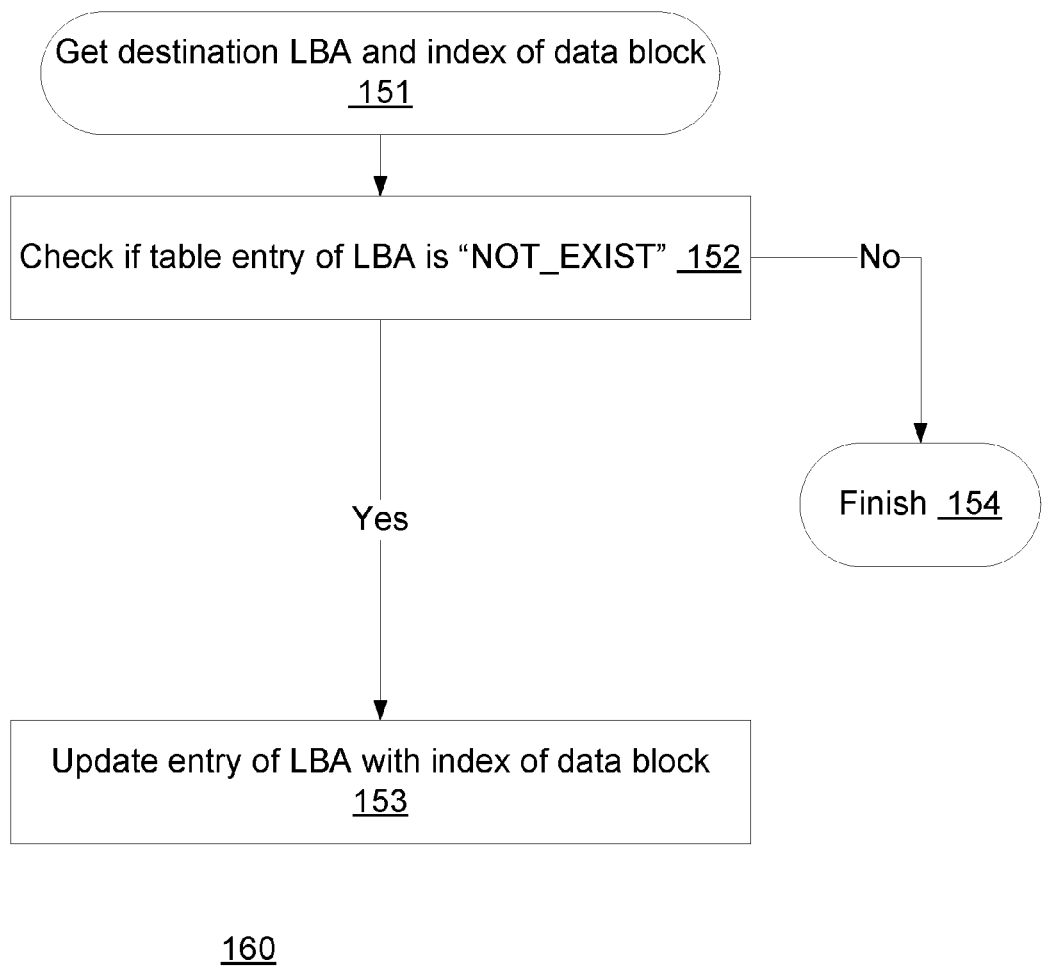
FIG. 7 illustrates a stage of the method of FIG. 4 according to an embodiment of the invention.

FIG. 7 illustrates stage 160 of method 100 according to an embodiment of the invention.

Stage 160 starts by stage 151 of getting destination LBA and index of data block.

Stage 151 is followed by stage 152 of checking if the table entry of that LBA is NON-EXIST. If yes—jump to stage 153 of update entry of LBA with index of data block. If no—finish process (stage 154).

Figure 8:
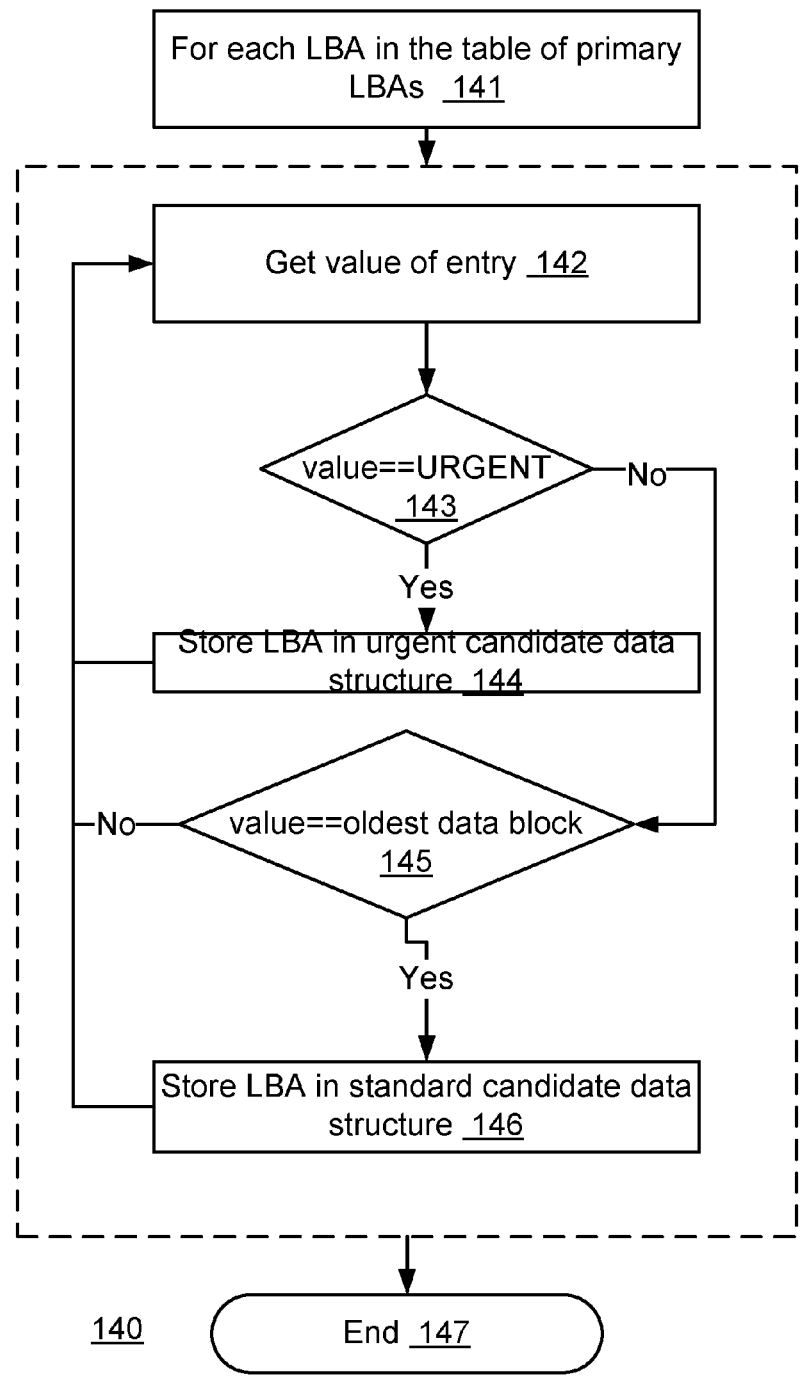
FIG. 8 illustrates a stage of the method of FIG. 6 according to an embodiment of the invention.

FIG. 8 illustrates stage 140 of method 130 according to an embodiment of the invention.

Stage 140 is executed for each LBA in the table of primary LBAs (as illustrated by control stage 141 that is followed by stages 142-146 that are executed for each LBA in the table of primary LBAs.

Stage 142 includes getting a value of an entry.

Stage 142 is followed by query stage 143 of checking if that value is urgent. If so-storing (stage 144) the LBS in urgent candidate data structure. Stage 144 is followed by stage 142.

If no—checking (stage 145) if the value indicates that the LBS is stored in the oldest data block. If no—jump to stage 142. If yes—storing (stage 146) the LBS in standard candidate data structure.

Figure 9:
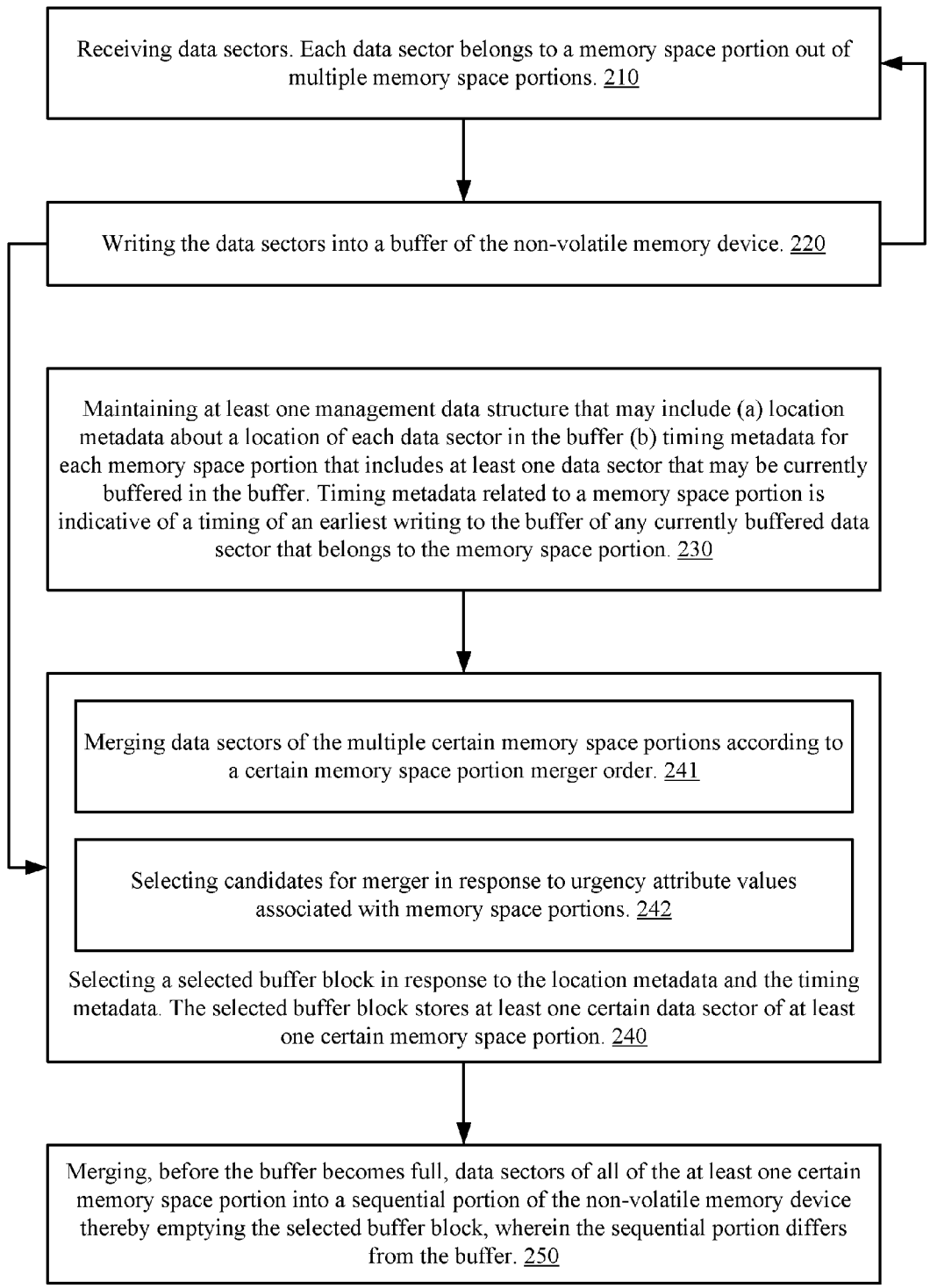
FIG. 9 illustrates method according to an embodiment of the invention.

FIG. 9 illustrates method 200 according to an embodiment of the invention. FIG. 10 illustrates stage 250 of method 200 according to an embodiment of the invention. FIG. 11 illustrates stage 230 of method 200 according to an embodiment of the invention.

Method 200 may be executed for managing a non-volatile memory device. Method 200 may start by stages 210 and 230.

Stage 210 includes receiving data sectors. Each data sector belongs to a memory space portion out of multiple memory space portions.

Stage 210 is followed by stage 220 of writing the data sectors into a buffer of the non-volatile memory device. The buffer may include multiple buffer blocks.

Stage 220 is followed by stages 210 and 240.

Stage 230 includes maintaining at least one management data structure that may include (a) location metadata about a location of each data sector in the buffer (b) timing metadata for each memory space portion that includes at least one data sector that may be currently buffered in the buffer, wherein timing metadata related to a memory space portion may be indicative of a timing of an earliest writing to the buffer of any currently buffered data sector that belongs to the memory space portion. Stage 230 is followed by stage 230.

Stage 240 includes selecting a selected buffer block in response to the location metadata and the timing metadata. The selected buffer block stores at least one certain data sector of at least one certain memory space portion. The term certain is merely used for simplicity of explanation.

Stage 240 is followed by stage 250 of merging, before the buffer becomes full, data sectors of all of the at least one certain memory space portion into a sequential portion of the non-volatile memory device thereby emptying the selected buffer block, wherein the sequential portion differs from the buffer.

The at least one certain memory space portion may include multiple certain memory space portions. Stage 240 may include stage 241 of merging data sectors of the multiple certain memory space portions according to a certain memory space portion merger order. The order determines which certain memory space portion will have its data sectors merged before those of other memory space portions.

Stage 240 may include stage 242 of selecting candidates for merger in response to urgency attribute values associated with memory space portions.

According to an embodiment of the invention the selecting may include selecting the oldest buffer block of the buffer as the selected buffer block. The oldest buffer block stores an earliest written data sector out of all data sectors currently buffered in the buffer.

The merging may be responsive to a size of a residual buffer space (GAP) that may be allocated for receiving data sectors during an execution of the merging. The size of the residual buffer space may be fixed—it may be determined regardless of a temporary status of the buffer. The size of the residual buffer space may equal a ratio between (a) a number of memory space portions of the multiple memory space portions, and (b) a number of buffer blocks.

Stage 250 may include stage 258 of executing multiple merge fragments. Thus—instead of performing all the merging operations at once—the merging process is segmented to f merging fragments.

Stage 250 may include stage 251 of determining a threshold that represents a number of data segments to be written to the buffer between an execution of two consecutive merge fragments such as to prevent an overflow of the buffer due to an execution of a merging of all data sectors currently buffered and a reception of new data sectors during the merging of all data sectors currently buffered.

Stage 251 may be triggered by various events such as be triggered whenever a buffer block may be filled. This allows the method to adjust the merging process to the state of the buffer and while keeping a relatively small GAP, change the merging progress to prevent buffer overflow.

Stage 251 of determining of the threshold may be responsive to a size of a residual buffer space that may be allocated for receiving data sectors during an execution of the merging.

According to an embodiment of the invention stage 250 may include stage 252 of determining of the threshold in response to at least some (and even to all) of the following parameters: (i) a number (NF) of empty buffer blocks, (ii) a number (NP) of data sectors required to fill a buffer block, (iii) a size (Sgap) of residual buffer space that is allocated for receiving data sectors during an execution of the merging; (iv) a number (NU) of buffer blocks that are not empty, (v) numbers (L(1)-L(NU)) of primary memory space portions per each buffer block; wherein a primary memory space portion of a buffer block is a memory space portion of which an earliest written data sector that is still buffered was written to the buffer block; (vi) a number (f) of merge fragments required for completing a merging that empties the selected buffer block; and (vii) a number (Q) of uncompleted merge fragments requires for a completion of a merging process that is executed when the determining of the threshold is calculated.

Stage 250 may include stage 253 of calculating of the threshold (P) by $$P = \min_{1 \le j \le NU} \left( \frac{(NF + j - 1) * NP - Sgap}{\sum_{k=1}^{j} L(k) * f + Q} \right)$$

This may include: (a) repeating, for each value of an index j that ranges between 1 and Nu: (a.1) calculating a first intermediate value that equals (NF+j−1)*NP−Sgap); (a.2) calculating a second intermediate value that equals a sum, over an index k that ranges between 1 and j, of (L(k)*f+Q); (a.3) dividing the first intermediate value by the second intermediate value to provide a third intermediate value; and (b) selecting the threshold to equal a minimal third intermediate value out of all intermediate third values calculated for different values of index j.

Stage 250 may include stage 254 of triggering an execution of at least one merge fragment if a number of data sectors written to the buffer since a last merge fragment reaches or exceeds a threshold.

Stage 250 may include stage 255 of triggering an execution of at least one merge fragment of a certain memory space portion if a merger related to the certain memory space portion may be urgent.

According to an embodiment of the invention stage 230 of managing at least one data structure may include stage 231 of managing a first management data structure, a second management data structure and a third management data structure.

Stage 231 may include stage 232-234.

Stage 232 may include creating pointers in the first management data structure, for each data sector corresponding to an associated memory space portion and a storage location of the data sector in the buffer.

Stage 233 may include updating the second management data structure to reflect, for each memory space portion, a buffer block that stores an earliest written data sector of the memory space portion.

Stage 234 may include updating the third management data structure to reflect a number of primary memory space portions per buffer block; wherein a primary memory space portion of a buffer block is a memory space portion of which an earliest written data sector that is still buffered was written to the buffer block.

Stage 230 may include stage 235 of suggesting a merge candidate. Stage 235 may include scanning the second management data structure; updating a first merge candidate list with memory space portion indices which are marked in the second management data structure as urgent; updating a second merge candidate list with memory space portion indices which are associated in the second management data structure to an oldest buffer block; wherein the oldest buffer block stores an earliest written data sector out of all data sectors currently buffered in the buffer; searching the first merge candidate list for an existing merge candidate; and searching the second merge candidate for an existing merge candidate, if the first merge candidate list is empty.

Stage 230 may include updating at least one of the second and third management data structures whenever a data sector from a memory space portion is written to the buffer for a first time or when a memory space portion is merged.

Figure 12:
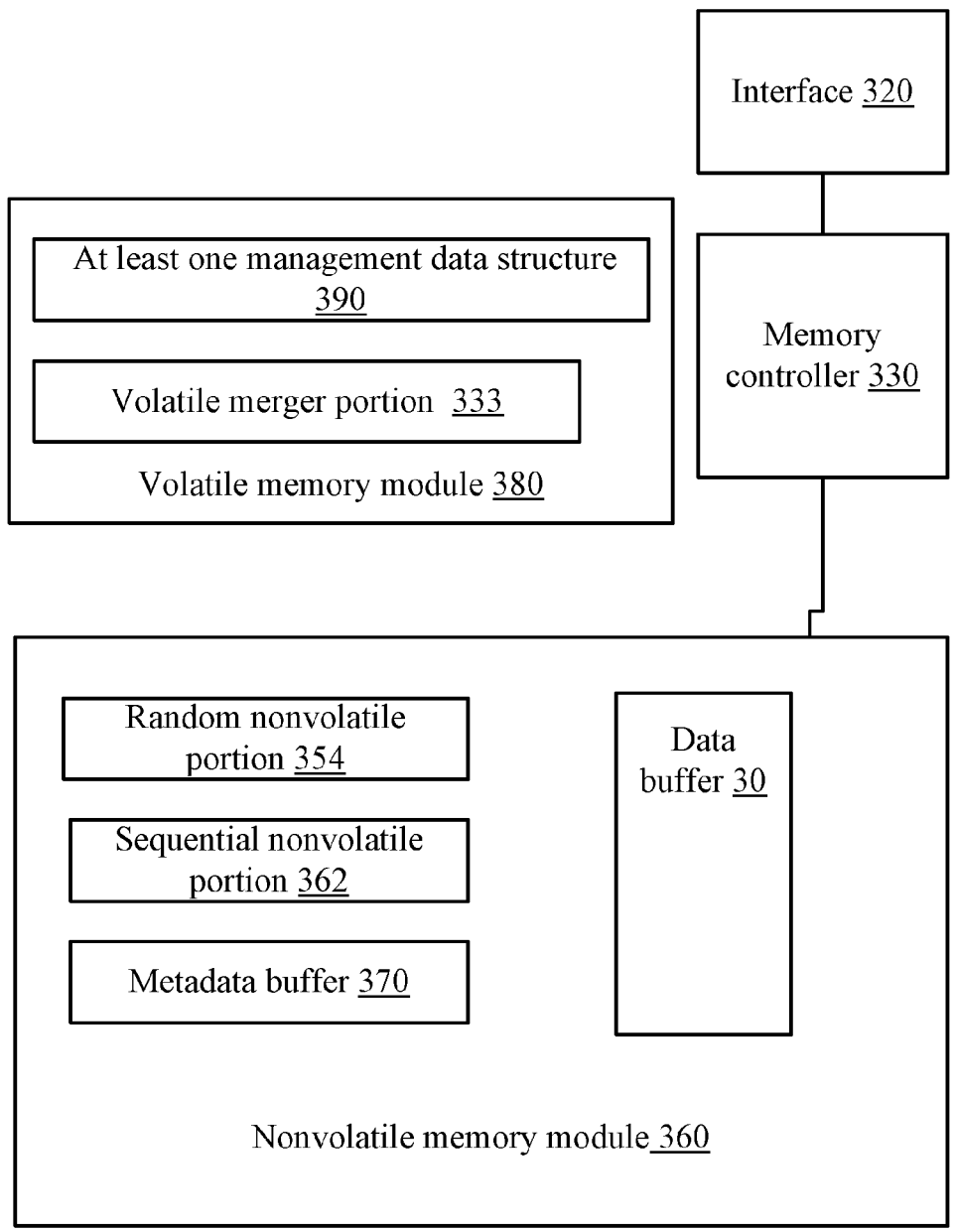
FIG. 12 illustrates a system according to an embodiment of the invention.

FIG. 12 illustrates a system 300 according to embodiments of the invention. System 300 includes an interface 320 that may be linked to a memory controller 330 and may be also linked to a nonvolatile memory module 360 and a volatile memory module 380.

The nonvolatile memory module 360 may contain a random portion 354, a sequential portion 362, a data buffer (such as ERSB) 30 and a metadata buffer 370.

The random portion may refer to a logically allocated random portion memory, while the sequential portion may refer to a logically allocated sequential portion memory. The metadata buffer 370 and other management portions may be allocated within the nonvolatile memory module 360. In FIG. 12 some data structures such as the metadata buffer 370 may be illustrated as being contained outside the random portion 354 or sequential portion 362, although these structures may be contained within nonvolatile memory. It is noted that the data buffer 30 may be included in the random portion 354.

System 300 may store at least one management data structure that may store metadata about the content of the volatile memory module 380, the content of the nonvolatile memory module 360 or both memory modules. The at least one management data structure can be stored at the volatile memory module 380 and, additionally or alternatively at the nonvolatile memory module 360.

FIG. 12 illustrates volatile memory module 380 and metadata buffer 370 as storing at least one management data structure 390 that includes location metadata (such as pointer) about a location of data sector in the data buffer 30 and timing metadata. FIG. 3 provides examples of various management data structures.

FIG. 12 also illustrates a volatile merger portion 333 that can be used when data sectors are merged. Data sectors that were previously stored at the random portion can be merged before being written to the sequential portion. Additionally or alternatively, the merging can occur between data sectors from sequential and random portions. The merging may include copying data sectors to be merged to volatile merger portion 333 and then writing the merged data sectors to the sequential portion.

System 300 may execute any of the method disclosed in the specification.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. Moreover, if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of managing a non-volatile memory device, the method comprising:
    receiving data sectors, each data sector belonging to a memory space portion out of multiple memory space portions;
    writing the data sectors into a buffer of the non-volatile memory device, the buffer having a plurality of buffer blocks;
    maintaining at least one management data structure that includes (a) location metadata about a location of each data sector in the buffer (b) timing metadata for each memory space portion that includes at least one data sector that is currently buffered in the buffer, wherein timing metadata related to a memory space portion is indicative of a timing of an earliest writing to the buffer of any currently buffered data sector that belongs to the memory space portion;
    selecting a selected buffer block in response to the location metadata and the timing metadata, the selected buffer block storing at least one certain data sector of at least one certain memory space portion; and
    merging, before the buffer becomes full, data sectors of all of the at least one certain memory space portion into a sequential portion of the non-volatile memory device thereby emptying the selected buffer block, wherein the sequential portion differs from the buffer.

2. The method according to claim 1 wherein the at least one certain memory space portion comprises multiple certain memory space portions; wherein the method further comprises merging data sectors of the multiple certain memory space portions according to a certain memory space portion merger order.

3. The method according to claim 1 wherein the selecting is responsive to urgency attribute values associated with memory space portions.

4. The method according to claim 1 wherein the selected buffer block is an oldest buffer block of the buffer; wherein the oldest buffer block stores an earliest written data sector out of all data sectors currently buffered in the buffer.

5. The method according to claim 1 wherein the merging is responsive to a size of a residual buffer space that is allocated for receiving data sectors during an execution of the merging.

6. The method according to claim 5 wherein the size of the residual buffer space is fixed.

7. The method according to claim 5 wherein the size of the residual buffer space equals a ratio between (b) a number of memory space portions of the multiple memory space portions, and (b) a number of buffer blocks.

8. The method according to claim 1 wherein the merging comprises executing multiple merge fragments.

9. The method according to claim 1, further comprising determining a threshold that represents a number of data segments to be written to the buffer between an execution of two consecutive merge fragments such as to prevent an overflow of the buffer due to an execution of a merging of all data sectors currently buffered and a reception of new data sectors during the merging of all data sectors currently buffered.

10. The method according to claim 9 comprising determining the threshold whenever a buffer block is filled.

11. The method according to claim 10 wherein the determining of the threshold is responsive to a size of a residual buffer space that is allocated for receiving data sectors during an execution of the merging.

12. The method according to claim 11 wherein the size of the residual buffer space is fixed.

13. The method according to claim 10 wherein the determining of the threshold is responsive to at least some parameters out of:
   a number (NF) of empty buffer blocks,
   a number (NP) of data sectors required to fill a buffer block,
   a size (Sgap) of residual buffer space that is allocated for receiving data sectors during an execution of the merging;
   a number (NU) of buffer blocks that are not empty;
   numbers (L(1)-L(NU)) of primary memory space portions per each buffer block;
   wherein a primary memory space portion of a buffer block is a memory space portion of which an earliest written data sector that is still buffered was written to the buffer block;
   a number (f) of merge fragments required for completing a merging that empties the selected buffer block; and
   a number (Q) of uncompleted merge fragments requires for a completion of a merging process that is executed when the determining of the threshold is calculated.

14. The method according to claim 9 wherein the determining of the threshold is responsive to NF, NP, Sgap, NP, NU, L(1)-L(NU), f and Q.

15. The method according to claim 9 wherein the calculating of the threshold (P) comprises:
   for each value of an index j that ranges between 1 and NU:
      calculating a first intermediate value that equals (NF+j−1)*NP−Sgap);
      calculating a second intermediate value that equals a sum, over an index k that ranges between 1 and j, of (L(k)*f−Q);
      dividing the first intermediate value by the second intermediate value to provide a third intermediate value;
   selecting the threshold to equal a minimal third intermediate value out of all intermediate third values calculated for different values of index j.

16. The method according to claim 9 comprising triggering an execution of at least one merge fragment if a number of data sectors written to the buffer since a last merge fragment reaches or exceeds a threshold.

17. The method according to claim 9 comprising triggering an execution of at least one merge fragment of a certain memory space portion if a merger related to the certain memory space portion is urgent.

18. The method according to claim 1 wherein the at least one data structure comprises a first management data structure, a second management data structure and a third management data structure; wherein the maintaining of the at least one data structure comprises:
   creating pointers in the first management data structure, for each data sector corresponding to an associated memory space portion and a storage location of the data sector in the buffer;
   updating the second management data structure to reflect, for each memory space portion, a buffer block that stores an earliest written data sector of the memory space portion; and
   updating the third management data structure to reflect a number of primary memory space portions per buffer block; wherein a primary memory space portion of a buffer block is a memory space portion of which an earliest written data sector that is still buffered was written to the buffer block.

19. The method according to claim 1, further comprising:
   scanning the second management data structure;
   updating a first merge candidate list with memory space portion indices which are marked in the second management data structure as urgent;
   updating a second merge candidate list with memory space portion indices which are associated in the second management data structure to an oldest buffer block; wherein the oldest buffer block stores an earliest written data sector out of all data sectors currently buffered in the buffer
   searching the first merge candidate list for an existing merge candidate; and
   searching the second merge candidate for an existing merge candidate, if the first merge candidate list is empty.

20. The method according to claim 19 comprising updating at least one of the second and third management data structures whenever a data sector from a memory space portion is written to the buffer for a first time or when a memory space portion is merged.

21. A system for managing a non-volatile memory device, the system comprises:
   an interface that is arranged to receive data sectors; wherein each data sector belongs to a memory space portion out of multiple memory space portions;
   a memory controller that is arranged to:
      write the data sectors into a buffer of the non-volatile memory device; wherein the buffer comprises multiple buffer blocks;
      maintain at least one management data structure that comprises (a) location metadata about a location of each data sector in the buffer (b) timing metadata for each memory space portion that includes at least one data sector that is currently buffered in the buffer, wherein timing metadata related to a memory space portion is indicative of a timing of an earliest writing to the buffer of any currently buffered data sector that belongs to the memory space portion;
      select a selected buffer block in response to the location metadata and the timing metadata; wherein the selected buffer block stores at least one certain data sector of at least one certain memory space portion; and merge, before the buffer becomes full, data sectors of all of the at least one certain memory space portion into a sequential portion of the non-volatile memory device thereby emptying the selected buffer block, wherein the sequential portion differs from the buffer.

22. A non-transitory computer readable medium that stores instruction for managing a non-volatile memory device, the instructions, once executed by a computer cause the computer to perform the stages of:

receiving data sectors; wherein each data sector belongs to a memory space portion out of multiple memory space portions;

writing the data sectors into a buffer of the non-volatile memory device; wherein the buffer comprises multiple buffer blocks;

maintaining at least one management data structure that comprises (a) location metadata about a location of each data sector in the buffer (b) timing metadata for each memory space portion that includes at least one data sector that is currently buffered in the buffer, wherein timing metadata related to a memory space portion is indicative of a timing of an earliest writing to the buffer of any currently buffered data sector that belongs to the memory space portion;

selecting a selected buffer block in response to the location metadata and the timing metadata; wherein the selected buffer block stores at least one certain data sector of at least one certain memory space portion; and merging, before the buffer becomes full, data sectors of all of the at least one certain memory space portion into a sequential portion of the non-volatile memory device thereby emptying the selected buffer block, wherein the sequential portion differs from the buffer.

* * * * *